(12) United States Patent
Anzai et al.

(10) Patent No.: US 8,181,513 B2
(45) Date of Patent: May 22, 2012

(54) FLOW METER

(75) Inventors: Masanori Anzai, Tokyo (JP); Masaki Seo, Tokyo (JP); Junichi Matsuda, Tokyo (JP); Manabu Muraoka, Tokyo (JP)

(73) Assignee: Azbil Corporation, Tokyo (JP)

(*) Notice: Subject to any disclaimer, the term of this patent is extended or adjusted under 35 U.S.C. 154(b) by 348 days.

(21) Appl. No.: 12/663,196

(22) PCT Filed: May 19, 2008

(86) PCT No.: PCT/JP2008/001245
§ 371 (c)(1),
(2), (4) Date: Dec. 4, 2009

(87) PCT Pub. No.: WO2008/152769
PCT Pub. Date: Dec. 18, 2008

(65) Prior Publication Data
US 2010/0175468 A1  Jul. 15, 2010

(30) Foreign Application Priority Data

| Jun. 8, 2007 | (JP) | 2007-153115 |
| Jun. 8, 2007 | (JP) | 2007-153126 |
| Jun. 8, 2007 | (JP) | 2007-153129 |

(51) Int. Cl.
*G01F 5/00* (2006.01)

(52) U.S. Cl. ......................................................... 73/202

(58) Field of Classification Search ............... 73/861.52, 73/861.65, 204.21, 202.5, 202; 137/599.13
See application file for complete search history.

(56) References Cited

U.S. PATENT DOCUMENTS

| 3,559,482 A * | 2/1971 | Baker et al. ................... 73/202.5 |
| 4,418,723 A * | 12/1983 | Koni et al. ...................... 138/42 |
| 4,672,997 A * | 6/1987 | Landis et al. .................. 137/554 |
| 5,750,892 A * | 5/1998 | Huang et al. ..................... 73/202 |
| 6,247,495 B1 * | 6/2001 | Yamamoto et al. ...... 137/599.13 |
| 6,655,207 B1 | 12/2003 | Speldrich et al. |
| 6,779,395 B2 * | 8/2004 | Hornung et al. ........... 73/204.21 |
| 7,464,611 B2 * | 12/2008 | Matter et al. ................ 73/861.52 |
| 7,654,157 B2 * | 2/2010 | Speldrich ................... 73/861.65 |
| 7,698,958 B2 * | 4/2010 | Matter et al. ................ 73/861.52 |

FOREIGN PATENT DOCUMENTS

| JP | 50-142262 A | 11/1975 |
| JP | 4-066819 A | 3/1992 |
| JP | 2002-005710 A | 1/2002 |
| JP | 2002-310767 A | 10/2002 |
| JP | 2003-523506 A | 8/2003 |
| JP | 2006-308518 A | 11/2006 |

* cited by examiner

*Primary Examiner* — Jewel V Thompson

(74) *Attorney, Agent, or Firm* — McDermott Will & Emery

(57) ABSTRACT

A flow meter includes: a body portion comprising a main flow path wherein flows a fluid to be measured, a first branch flow portion wherein the fluid to be measured branches and flows from the main flow path, a second branch flow portion wherein the fluid to be measured, which branches and flows from the first branch flow portion, flows into the main flow path, and narrow portions for restricting the flow of the fluid to be measured, provided in a primary flow path between the branch flow portions, a branched flow path structuring portion through which flows the fluid to be measured, connected to the branch flow portions; and a fluid measuring portion provided with a sensor disposed facing a flow path that is provided in the branched flow path structuring portion, wherein the sensor measures the fluid based on the detection results of the fluid introduced from the branch flow portions.

10 Claims, 10 Drawing Sheets

FLOW METER

CROSS REFERENCED TO RELATED APPLICATION

This is the U.S. national phase application under 35 U.S.C. §371 of International Patent Application No. PCT/2008/001245 filed May 19, 2008, which claims the benefit of Japanese Application No. 2007-153129, filed Jun. 8, 2007; Japanese Application No. 2007-153126, filed Jun. 8, 2007 and Japanese Application No. 2007-153115, filed Jun. 8, 2007. The International Application was published on Dec. 18, 2008 as International Publication No. WO/2008/152769 under PCT Article 21(2) the contents of which are incorporated herein in their entirety.

FIELD OF TECHNOLOGY

The present invention relates to a flow meter for measuring flow rates and flow speeds of fluids to be measured.

BACKGROUND OF THE INVENTION

When a conventional flow meter is removed from the pipe wherein the fluid to be measured flows, at the time of maintenance were an investigation when there is a problem, or the like, the flow of the fluid to be measured within the pipe is stopped and the pressure is released (see, for example, Japanese Unexamined Patent Application Publication 2002-310767 ("JP '767").

Furthermore, the flow path structure used in a conventional flow meter, as illustrated in FIG. 8, comprises: a base 50 wherein a secondary flow path block 52 for forming a secondary flow path is formed integrally on the outer peripheral surface of a main flow tube 51; a seal plate 54 for sealing the opening portion of the secondary flow path block 52, having a measurement hole 53 in the center portion thereof: a circuit board 55, stacked on the seal plate 54, having, on the bottom surface thereof, a flow rate detecting element that is inserted into the measurement hole 53; and a cover 56 for covering the opening portion of the secondary flow path block 52. Note that the seal plate 54 and the circuit board 55 are secured by screws to the secondary flow path block 52.

Furthermore, as illustrated in FIG. 9 and FIG. 10, the base 50 of the flow path structure is structured from: a flat L-shaped introduction vertical channel 62 for elevating the fluid that flows in from the measurement hole 61; a first secondary flow path 63 and a third secondary flow path 65 that are formed parallel to the main flow tube 51: a second secondary flow path 64 and a fourth secondary flow path 66 that are formed in a direction that is perpendicular to the main flow tube 51; and an expulsion vertical channel 67 for expelling the fluid from an expelling opening 68 into the main flow tube 51. The introduction vertical channel 62 has a flat L shape, and thus a portion of the fluid that has been introduced flows in the direction that is opposite to the flow of the main flow tube 51, and because dust and the like has a greater mass than expected, the dust, and the like, has a difficult time flowing in the opposite direction, so that the dust, and the like, flows through the first secondary flow path 63 to the expulsion vertical channel 67. A portion of the fluid that is introduced flows through the 2 second secondary flow paths 64, and after confluence, connect to the third secondary flow path 65. A detection region with a narrow width is formed so as to correct nonuniformity of the flow of the fluid, through narrowing the flow path through having protruding portions 69a, which are provided on partitioning walls 69, which are provided on both sides of the third flow path 65, face each other. The fluid, after detection, branches into a fourth secondary flow paths 66, to connect with the expulsion vertical channel 67. Finally, the fluid connects to the main flow tube 51 through the expelling opening 68. (see, for example, Japanese Unexamined Patent Application Publication 2006-308518 ("JP '518".)

SUMMARY OF THE INVENTION

In order to perform investigations or maintenance, or the like, when there is a problem with a conventional flow meter that is inserted into, for example, a pipe in an air supply facility in a factory, the pipe would be closed by a cutoff valve, or the like, to stop the flow of the fluid to be measured within the pipe, and then the flow meter would be removed from the pipe, and thus there is the problem of having to stop the operation of the air supplying facility each time the flow meter is removed from the pipe. In other words, with conventional flow meters it may be necessary to stop the operation of the facility by stopping the flow of air within the piping each time adjustments or maintenance is performed when there is a problem.

Additionally, even though the flow meter is removed due to the investigations or maintenance when there is a problem, if, when starting up to the operation of the air supplying facility, cutoff valves are provided in the pipe on both the upstream side and the downstream side of the flow meter and a bypass pipe for carrying the flow of air circuitously is provided when both of the cutoff valves are closed, then it becomes possible to remove the flow meter main unit without stopping the flow of air within the pipe. However, this has a problem in that it complicates the configuration of the piping and may require increased installation space because cutoff valves and a bypass flow path are provided for each flow meter.

As another approach, there is a flow meter that has, internally, a flow path into which the flow of the fluid to be measured within the piping is caused to branch, and the measurement is performed by exposing the sensor to the internal flow path, where, if the flow meter is one wherein the flow meter-side portion can be removed from the flow meter main unit, then it becomes possible to remove the flow meter-side portion while still enabling the air supplying facility to continue to operate, through the provision of cutoff valves in the flow meter internal flow path on the upstream side and the downstream side of the flow meter-side portion to cut off the fluid to be measured that flows from the pipe into the internal flow path. However, a flow meter of this structure has a problem in that there is the need for the cutoff valves and the mechanisms by which to open and close these cutoff valves, and the like, not only increasing the part counts, but causing the overall dimensions of the flow meter to be larger, placing constraints on the equipment in which the flow meter can be installed.

Additionally, in the flow meter disclosed in JP '518, described above, the flow rate detecting element (that is, the sensor) is exposed, and thus there is a problem in that the sensor might get bumped or broken when removing the sensor portion from the secondary flow path block to make adjustments at the time of maintenance or when there is a problem. Furthermore, when the flow path is formed so as to be small, it is difficult to secure space for an adequately straighten flow of the fluid, and thus there is a problem in that there will be turbulence in the fluid in the flow rate detecting flow path. Furthermore, it is difficult also to secure space for the provision of a metal mesh, for increasing the flow straightening effect on the fluid on the upstream side, and even if such a metal mesh can be provided, it is difficult to provide an adequate number of metal meshes to obtain the flow straightening effect.

The present invention was created in order to solve the problems such as set forth above, and the object thereof is to provide a flow meter with a simple structure that can be reduced in size, which does not require cutoff valves or bypass flow paths as described above, and wherein maintenance or investigation of problems can be performed with the air supplying facility continuing to operate.

Furthermore, an object is to provide a flow meter wherein the fluid measuring portion can be removed without the sensor being broken, because the sensor portion is protected, in a flow meter wherein the fluid measuring portion can be removed. Yet another object is to provide a flow meter having a flow path structure capable of exhibiting full flow straightening effects, even in a flow meter wherein the flow path has been made small.

The flow meter according to the present invention includes: a body portion having a main flow path wherein a fluid to be measured flows, a first branch flow path for branching the flow of the fluid to be measured from the main flow path, a second branch flow path for causing the fluid to be measured, wherein the flow has branched from the first flow path, to flow into the main flow path, and a narrow portion for narrowing the flow of the fluid to be measured, provided in the main flow path between the first and second branch flow paths; a branched flow path structuring portion that is provided with a flow path wherein the fluid to be measured flows, connected to the first and second flow path; and a fluid measuring portion, comprising a sensor disposed facing a flow path provided in the branch flow path structural portion, for measuring the fluid to be measured based on the detection results for the fluid to be measured that is introduced from the branch flow path, measured by the sensor; wherein the branched flow path structuring portion and the fluid measuring portion are attached detachably to the body portion.

Given the flow meter according to the present invention, the first branch flow path and the second branch flow path are formed from a narrow portion of a small hole that passes through the main flow path.

Given the flow meter according to the present invention, the first branch flow path and the second branch flow path comprise narrow portions of small holes that open on the main flow path side, and hole portions, that open on the branched flow path structuring portion side, with hole diameters that are larger than the hole diameters of the narrow portions, connected to the narrow portions.

Given the flow meter as set forth in the present invention, there is a fluid measuring portion, having a sensor for detecting a fluid to be measured, for measuring a flow rate of a fluid to be measured based on the detection result of the sensor; a body portion, wherein is formed a main flow path wherein the fluid to be measured flows, provided with a first branch flow path and a second branch flow path for branching the flow of the fluid to be measured; and a plate-shaped branched flow path structuring portion, provided between the body portion and the fluid measuring portion, for both covering the sensor and for connecting the first branch flow path and the second branch flow path; wherein the branched flow path structuring portion and the fluid measuring portion attached detachably to the body portion.

Given the flow meter as set forth in the present invention, there is a fluid measuring portion, having a sensor for detecting a fluid to be measured, for measuring a flow rate of a fluid to be measured based on the detection result of the sensor; a body portion for forming a main flow path wherein the fluid to be measured flows, provided with a first branch flow path and a second branch flow path for branching the flow of the fluid to be measured; and a branched flow path structuring portion, made from a plate-shaped member that is provided between the body portion and the fluid measuring portion, having a first flow path that is formed on a surface on the body side wherein is introduced the fluid to be measured that branches and flows through the first branch flow path, a second flow path that is formed on a surface on the flow measuring portion side, a first through hole portion for connecting the first flow path and the second flow path, a third flow path that is formed on a surface on the body portion side for causing the fluid to be measured to flow out into the main flow path through the second branch flow path, and a second connecting hole portion for connecting the second flow path and the third flow path; wherein the sensor is provided facing the second flow path; and the branched flow path structuring portion and the flow measuring portion are attached detachably to the body portion.

Given the flow meter according to the present invention, a partitioning member is provided for separating a surface on the body portion side into a first flow path and a third flow path, where the first flow path and the third flow path are provided with a flow straightening element for straightening the flow of the fluid to be measured, and a second flow path is provided with a vector adjusting member for causing the flow speed vectors of the fluid to be measured to be uniform.

Given the flow meter according to the present invention, a flow meter that is provided with a sensor for detecting a fluid to be measured and a fluid measuring portion for measuring the flow rate of the fluid to be measured based on the detection results of the sensor comprises: a branched flow path structuring portion, made from a plate-shaped member that is provided between a body portion, wherein the fluid to be measured flows, and a fluid measuring portion, wherein are formed a first and a third flow path on the body portion-side surface at which is introduced the fluid to be measured for which the flow has been branched from the body portion, and a first and second connecting hole portion, formed on the fluid measuring portion-side surface, for connecting the body portion side and the fluid measuring portion side, and a second flow path wherein the fluid to be measured that is introduced through the first and the third flow paths and the first and second connecting hole portions is exposed to the sensor; wherein the branched flow path structuring portion is provided with a partitioning member for partitioning into a fluid to be measured flow upstream side first flow path and downstream side third flow path, a buffer portion made from a recessed portion wherein the fluid to be measured that flows in from the body portion is retained, first and third flow paths, and a flow straightening element for straightening the flow of the fluid to be measured that flows from the buffer portion in the direction of the first and second through hole portions.

Given the flow meter as set forth in the present invention, the flow speed vector for the fluid to be measured that is exposed to the sensor in the second flow path is essentially perpendicular to the flow speed vector of the fluid to be measured that flows in the main flow path of the body portion.

Given the flow meter according to the present invention, the flow straightening element is a plurality of raised places extending from the opening portions of the first and second connecting hole portions, where the plurality of raised portions is formed so that the lengths from the first and second connecting hole portions are shorter the nearer to the buffer portion, and the flow of the fluid to be measured from the buffer portion is directed to the first and second connecting hole portions by passing between the raised portions. Given the flow meter as set forth in the present invention, the branched flow path structuring portion is provided with a metal mesh retaining piece for retaining a metal mesh for straightening the flow of the fluid to be measured that flows through the second flow path on the sensor side.

Given the present invention there is a body portion that is provided with a main flow path wherein the fluid to be measured flows, a first branch flow path for branching the flow of the fluid to be measured from the main flow path, a second flow path for causing the fluid to be measured for which the flow has been branched from the first branch flow path to flow into the main flow path, and a narrow portion for narrowing the flow of the fluid to be measured, provided in the main flow path between the first and the second branch flow paths; a branched flow path structuring portion that is provided with a flow path to carry the fluid to be measured for connecting the first and second branch flow paths; and a fluid measuring portion, having a sensor that is disposed facing the flow path that is provided in the branched flow path structuring portion, for measuring the fluid to be measured based on the detection result, detected by the sensor, for the fluid to be measured introduced from a branch flow path; wherein the branched flow path structuring portion and the fluid measuring portion are attached detachably to the body portion, making it possible to remove the branched flow path structuring portion and the fluid measuring portion from the body portion without stopping the flow of the fluid to be measured within the pipe, because the flow rate of the fluid to be measured that flows out from the main flow path is controlled by the first branch flow path and the second branch flow path. This has the result of making it possible to perform maintenance and investigation when that are problems easily, without stopping the flow of the fluid to be measured within the pipe, and also the result of eliminating the need for cutoff valves, and the like, for shutting off the fluid to be measured that would flow out of the pipe, thus making it possible to achieve a reduction in size using a simple structure.

Given the present invention, the first branch flow path and the second branch flow path are made from narrow portions with small holes that penetrate to the main flow path, and thus the flow rate of the fluid to be measured that flows out from the main flow path is controlled by the narrow portions with small holes, with the effect of making it possible to remove the branched flow path structuring portion and the fluid measuring portion from the body portion without stopping the flow of the fluid to be measured within the pipe.

Given the present invention, the first branch flow path and the second branch flow path are structured from narrow portions that are formed from small holes that are open on the main flow path side, and from hole portions that are open on the branched flow path structuring portion side with a hole diameter that is larger than the hole diameter of the narrow portions, connected to the narrow portions, and thus there is the effect of being able to detach the branched flow path structuring portion and the fluid measuring portion easily because the force of the spray of the fluid to be measured into the branched flow path structuring portion side is reduced by the hole portions. Additionally, even in this state wherein the fluid measuring portion is attached to the body portion, the flow speed of the fluid to be measured for which the flow branches to the fluid measuring portion side is reduced by the hole portion that has a hole diameter that is larger than the hole diameter of the narrow portion, thus relaxing the physical impact of the fluid onto the fluid measuring portion.

Given the present invention, there is: a fluid measuring portion for measuring the flow rate of a fluid to be measured based on the detection result by a sensor for detecting the fluid to be measured; a body portion that that forms a main flow path through which the fluid to be measured flows and that is provided with a first branch flow path and a second branch flow path for branching the flow of the fluid to be measured; and a flat branched flow path structuring portion that is provided between the body portion and the fluid measuring portion, and that not only covers the sensor, but that also connects the first branch flow path and the second branch flow path; wherein the branched flow path structuring portion and the fluid measuring portion are attached detachably to the body portion, and thus even when the fluid measuring portion is removed from the body portion, the branched flow path structuring portion functions as a cover for the sensor, preventing the sensor from being exposed and from becoming damaged or broken.

Given the present invention, there is a fluid measuring portion for measuring a flow rate of a fluid to be measured based on a detection result of a sensor for detecting the fluid to be measured; a body portion that forms a main flow path wherein the fluid to be measured flows and which is provided with a first branch flow path and a second branch flow path for branching the flow of the fluid to be measured; and a branched flow path structuring portion, provided between the body portion and the flow measuring portion, having a first flow path, formed on the surface on the body portion side, for introducing the fluid to be measured for which the flow has been branched through the first branch flow path, a second branch flow path that is formed on the surface on the fluid measuring portion side, a first connecting hole portion for connecting the first flow path and the second flow path, a third flow path, formed on the surface on the body portion side, for causing the fluid to be measured to be expelled into the main flow path through the second branch flow path, and a second connecting hole portion for connecting between the second flow path and the third flow path; wherein the sensor is disposed facing the second flow path; and the branched flow path structuring portion and the fluid measuring portion are attached detachably to the body portion; and thus even when the fluid measuring portion is removed from the body portion, the branched flow path structuring portion functions as a cover for the sensor, making it possible to prevent the sensor from being exposed and from becoming damaged or broken. Furthermore, the flow path is reversed through the provision of the first flow path, the second flow path, the third flow path, the first connecting hole, and the second connecting hole, in a structure wherein the flow path through which the fluid to be measured flows is provided so as to be long, thus making it possible to adequately straighten the flow of the fluid to be measured, making it possible to achieve accurate flow rate measurements, while also making it possible to reduce the size of the fluid measuring portion.

Given the present invention, a partitioning member is provided for partitioning the surface on the body portion side of the branched flow path structuring portion into a first flow path and a third flow path, and a flow straightening element for straightening the flows of the fluid to be measured is provided in both the first flow path and the third flow path, and thus it is possible to obtain a flow straightening effect for the forward flow, wherein the fluid to be measured for which flow straightening has been performed in the first flow path flows into the third flow path, and for the backward flow, wherein the fluid to be measured for which flow straightening has been performed in the third flow path flows into the first flow path, thus making it possible to achieve flow rate measurements of the fluid to be measured with high accuracy.

Given the present invention, the structure is such that the flow path is reversed through the provision of the first and third flow paths, the first and second connecting holes, and the second flow path, and is provided with a flow straightening element for straightening the flow of the fluid to be measured through a flow straightening element after the flow speed of the fluid to be measured has been reduced in a buffer portion that is a recessed portion wherein the fluid to be measured that flows in from the body portion resides, and thus it is possible to perform flow straightening by securing an adequately long length for the flow path through which the fluid to be measured flows, making it possible to achieve accurate flow rate measurements. This also enables the flow meter to be reduced in size.

Given the present invention, the structure is such that the flow speed vector of the fluid to be measured that flows through the main flow path of the body is essentially perpendicular to the flow speed vector of the fluid to be measured that is exposed to the sensor in the second flow path, and thus even when the body portion is disposed so that the fluid to be measured that flows in the main flow path flows in the direction of gravity, such as when the flow meter is attached to a vertical pipe, the flow speed vectors of the fluid to be measured that is exposed to the sensor will be parallel, and thus the temperature distribution within the fluid to be measured, in the range of the upstream and downstream resistors that are provided in the sensor, will not be biased towards either of the resistors. This also makes it possible to secure an adequately long flow path through which the fluid to be measured flows.

Given the present invention, the lengths from the connecting hole portion of the flow straightening element that is a plurality of raised locations that extend from the opening portions of the first and second connecting hole portions are formed so as to be shorter the nearer the buffer portion, and thus the inlet of the flow path from the first flow path to the third flow path from the buffer portion are made wider and the fluid to be measured that flows through the first and the third flow path can be caused to flow with extreme uniformity, making it possible to achieve a flow straightening effect.

Given the present invention, the branched flow path structuring portion is structured so as to be provided with a metal mesh retaining piece for retaining a metal mesh for straightening the flow of the fluid to be measured that flows through the second flow path on the sensor side, thus making it possible to perform also thorough flow straightening prior to the fluid to be measured being exposed to the sensor.

BRIEF DESCRIPTION OF THE DRAWINGS

FIG. 1B is a schematic front view the flow meter of FIG. 1a;

FIG. 1C is a schematic top view the flow meter of FIG. 1a;

DETAILED DESCRIPTION OF THE INVENTION

In order to explain the present invention in greater detail, a most preferred form for carrying out the present invention will be described below in accordance with the appended drawings.

Figure 1A:
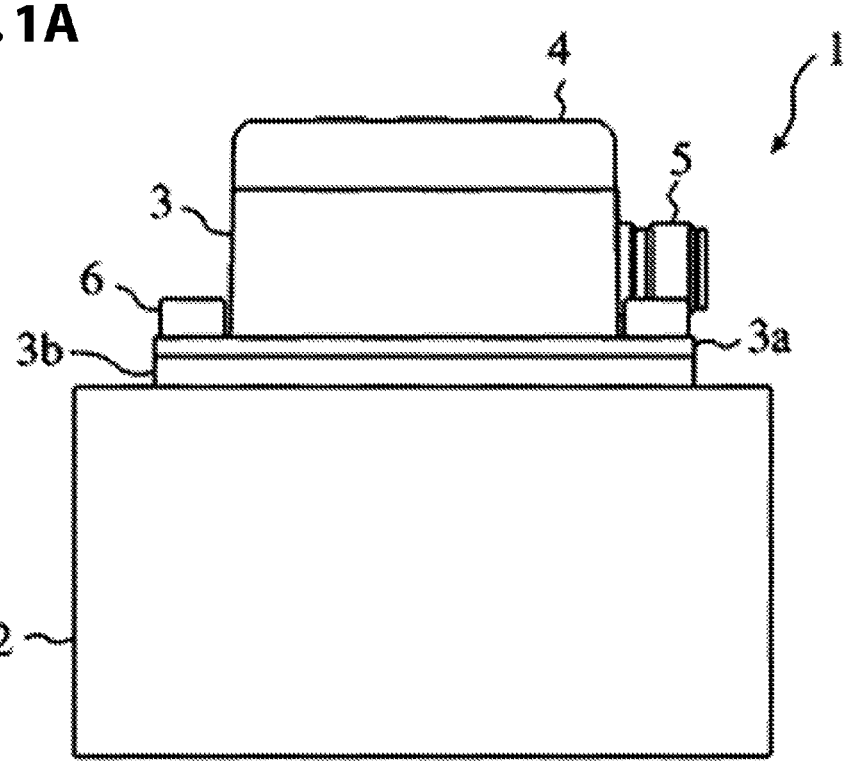
FIG. 1A is a schematic side view illustrating the structure of a flow meter as set forth in an embodiment according to the present invention.
Figure 1B:
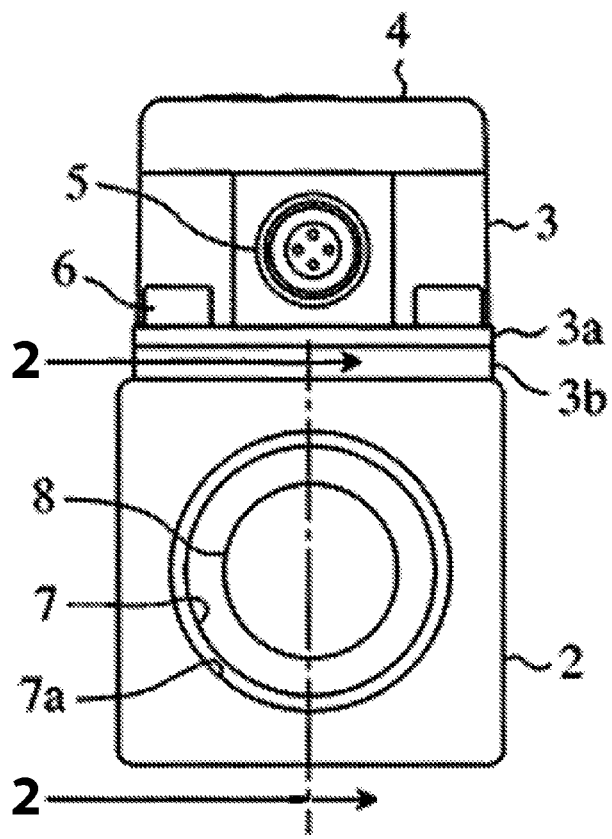
Figure 1C:
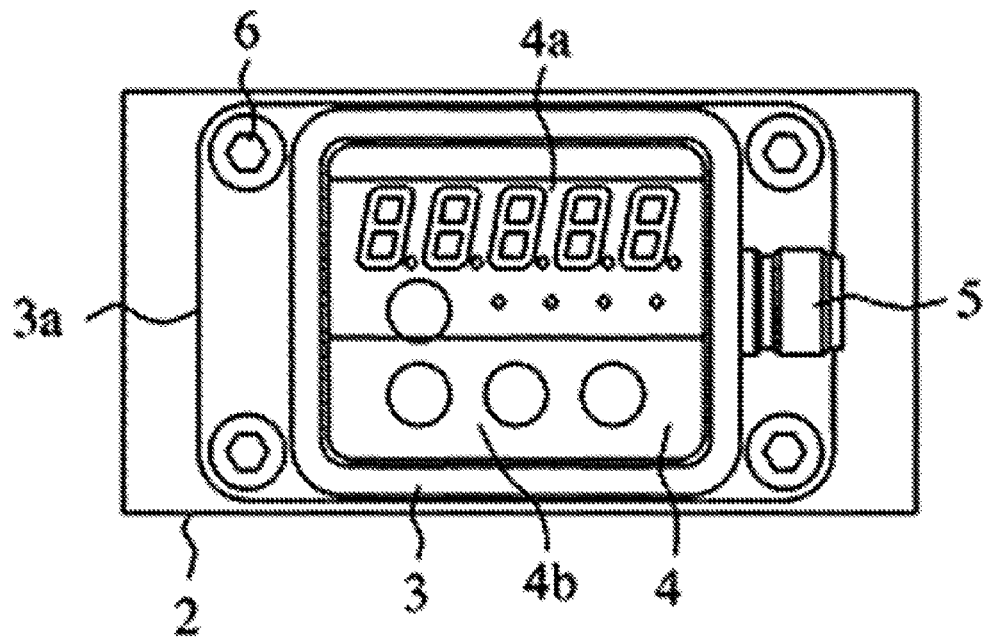

FIG. 1 is a diagram illustrating the structure of a flow meter as set forth in an embodiment according to the present invention, where, in the FIG. 1 (*a*) shows a side view, FIG. 1 (*b*) is a view from the b direction in FIG. 1 (*a*), and FIG. 1 (*c*) is a view from the a direction in FIG. 1 (*a*). As is illustrated in FIG. 1 (*a*), the flow meter 1 is provided with a body portion 2 and a fluid measuring portion 3. The body portion 2 is a structural component that is attached to a pipe, not shown, wherein the fluid to be measured flows, and as illustrated in FIG. 1 (*b*), a main flow path 7 wherein the fluid to be measured flows is provided, and an orifice (narrow portion) 8 is formed in this flow path. Furthermore, attaching portions 7*a*, wherein threaded grooves are formed, are provided at both ends of the main flow path 7, for attachment to a pipe, with the airtightness maintained by screwing onto the end portion of a pipe with, for example, an airtight seal interposed therebetween.

Figure 2:
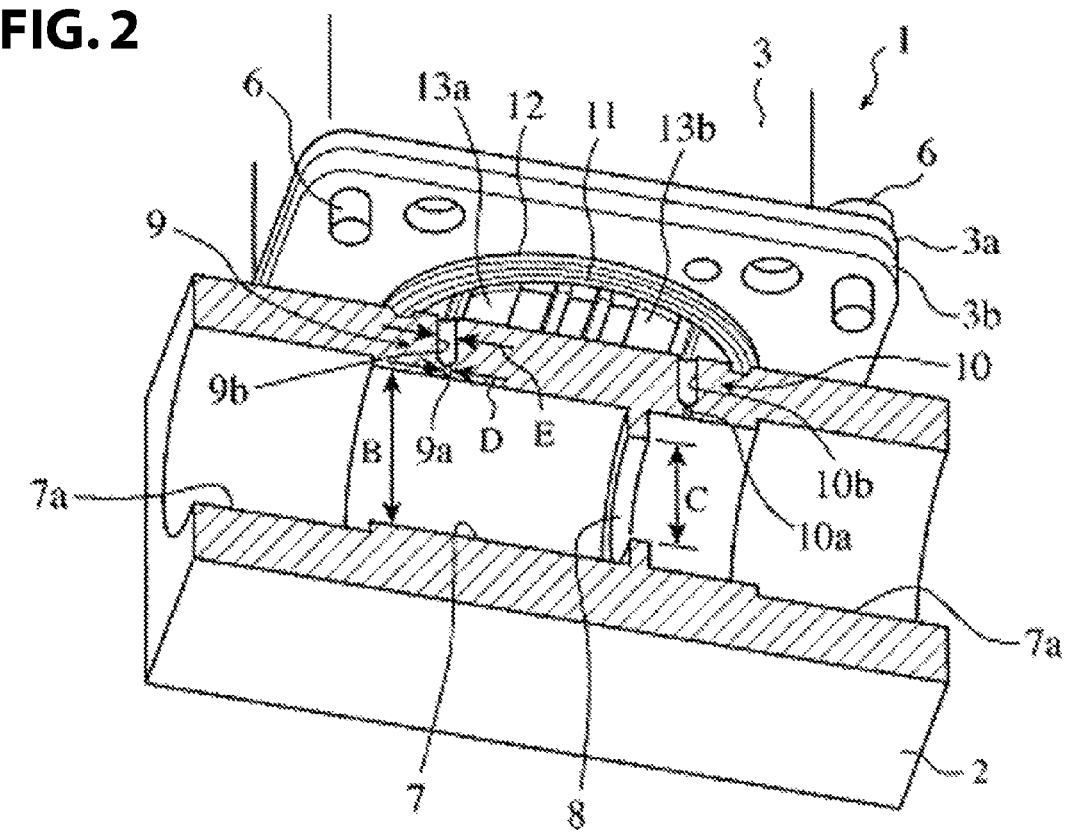
FIG. 2 is a perspective view showing a cross section wherein the flow meter 1 of FIGS. 1A-C is sectioned along the line A-A in FIG. 1B.

The fluid measuring portion 3 houses a calculation processing unit, such as a microcomputer, for performing processes for measuring the flow rate, and the like, of the fluid to be measured, where a frame that is provided with contacts 5 for exchanging signals between the measurement processing portion and an external device is formed integrally with an attaching plate portion 3*a*, and, as illustrated in FIG. 2, is attached to the body portion 2 with a substrate 3*b*, contained in a branched flow path structuring portion 11, described below, interposed therebetween. The attachment of the fluid measuring portion 3 to the body portion 2 is performed by screwing attachment screws 6 into screw holes, not shown, provided in the body portion 2, to attach detachably to the body portion 2. In this way, the fluid measuring portion 3 and the branched flow path structuring portion 11 are attached detachably to the body portion 2, and thus removal is possible without requiring the cutoff valves and bypass flow path, and the like, explained in the prior art section, making it possible to perform maintenance and investigations when there are problems, without interrupting the operation of the air supplying facility. Note that when the fluid measuring portion 3 and the branched flow path structuring portion 11 have been removed from the body portion 2, the main the flow path 7 is open to atmosphere through a branch flow portion (first branch flow path) 9 and a branch flow portion (second branch flow path) 10, described below.

Additionally, a display/setting portion 4, provided with a display portion 4*a* and a setting input portion 4*b*, is provided on the fluid measuring portion 3, as illustrated in FIG. 1 (*c*). The display portion 4*a* displays the measurement results for the flow rate, and the like, of the fluid to be measured, inputted from a measurement processing portion. The setting input portion 4b is a structural element for inputting setting data into the measurement processing portion and the display portion 4a, and, for example, setting data, and the like, that switches the content of the display in the display portion 4a is inputted through pressing a setting button. Note that in the example in FIG. 1, a case is illustrated wherein the display portion 4a is equipped on the fluid measuring portion 3; however the structure may instead be one wherein there is no display portion.

FIG. 2 is a perspective view illustrating a cross-section wherein the flow meter 1 is sectioned along the line A-A in FIG. 1 (b). As illustrated in FIG. 2, a hole portion is formed in the center portion of the substrate 3b, and the branched flow path structuring portion 11 is disposed in this hole portion, with a rubber packing 12, which is elliptical in its cross section, is disposed so as to encompass the branch flow path structuring portion 11. The branch flow path structuring portion 11 is a plate-shaped member wherein flow paths are formed on both the body portion 2 side and the fluid measuring portion 3 side. Screwing attachment screws 6 into the screw holes provided in the body portion 2 with the branched flow path structuring portion 11 in the installed state causes the rubber packing 12 to be pressed against the surface of the sensor 15 side of the attaching plate portion 3a and against the attaching surface of the body portion 2, to seal the branched flow path structuring portion 11.

Additionally, a branch flow portion (the first branch flow path) 9 and a branch flow portion (the second branch flow path) 10, which connect to the main flow path 7, are formed before and after the orifice 8. The pressure differential produced by the orifice 8 causes the fluid to be measured to branch and flow into the branched flow path structuring portion 11 through the branch flow portion 9, and causes the fluid to be measured that has passed through the branched flow path structuring portion 11 to flow out through the branch flow portion 10 into the main flow path 7. Note that the fluid to be measured that flows between the body portion 2 and the fluid measuring portion 3 through the branched flow portions 9 and 10 undergoes particulate removal through filters 13a and 13b that are disposed in the branched flow path structuring portion 11. Furthermore, depending on the necessity, the structure may instead of the one without the filters 13a and 13b.

The branched flow portions 9 and 10 are structured from small diameter (diameter D) narrow portions 9a and 10a that penetrate to the main flow path 7, and hole portions 9b and 10b of an opening diameter (diameter E) that is larger than that of the narrow portions 9a and 10a, connecting thereto. In the fluid to be measured that has a flow that branches from the main flow path 7, the flow speed is increased by the small opening diameter narrow portion 9a, where the flow speed is decreased by the hole portion 9b wherein the hole diameter is larger than that of the narrow portion 9a, and this fluid to be measured is introduced into the branched flow path structuring portion 11. The narrow portions 9a and 10a may have, for example, a diameter of about 1 mm, or may be structured by small holes with an even smaller opening diameter in a range that does not deviate from the spirit or intent of the present invention, where the hole portions 9b and 10b may have opening diameters capable of relaxing the flow speeds of the fluid to be measured that has been increased through the narrow portions 9a and 10a.

In this way, in the flow meter 1 as set forth in one embodiment, the fluid to be measured branches to flow through the branched flow portions 9 and 10, which have the small hole narrow portions 9a and 10a, from the main flow path 7 into the branched flow path structuring portion 11 and then back into the main flow path 7 from the branched flow path structuring portion 11. That is, the branch flow portions 9 and 10 comprise the narrow portions 9a and 10a that are made from holes that pass to the main flow path 7 and hole portions 9b and 10b that have openings with opening diameters that are larger than those of the narrow portions 9a and 10a on the fluid measuring portion 3 side, connected to the narrow portions 9a and 10a, and because the flow speed of the fluid to be measured that branches and flows to the fluid measuring portion 3 side through the narrow portions 9a and 10a and the hole portions 9 b and 10b are reduced, the force with which the fluid to be measured is sprayed is reduced, making it possible to detach the fluid measuring portion 3 easily from the body portion 2.

For example, even if, in an air supplying facility within a factory, or the like, the fluid measuring portion 3 were removed temporarily from the body portion 2 in order to perform maintenance or an investigation when there is a problem, the air leak produced through the tiny small diameter narrow portions 9a and 10a would be only a small amount, and thus there is no need to stop the flow of the air within the pipe. Additionally, it is possible to make a replacement quickly when the fluid measuring portion 3 is removed temporarily from the body portion 2, so if, in this way, only a small air leak is produced, there is no need for a cutoff valve to cutoff the fluid to be measured that flows from the main flow path 7 to the branched flow portions 9 and 10, enabling a simple structure for the flow meter and enabling a reduction in size.

Additionally, while the discussion above illustrates a case wherein the branch flow portions 9 and 10 have two-stage structures comprising the narrow portions 9a and 10a and the hole portions 9b and 10b, the branch flow portions 9 and 10 may instead be structured from connecting holes (the holes connecting from the main flow path 7 side to the fluid measuring portion 3 side, having the opening diameter of the narrow portions 9a and 10a) having opening diameters that are identical on both the main flow path 7 side and the fluid measuring portion 3 side. Even when this structure is used, removal is still possible without requiring cutoff valves, or the like, to shut off the flow of the fluid to be measured within the pipe, making it possible to perform maintenance or investigations, when there are problems, with the air supplying facilities still operating.

Figure 3:
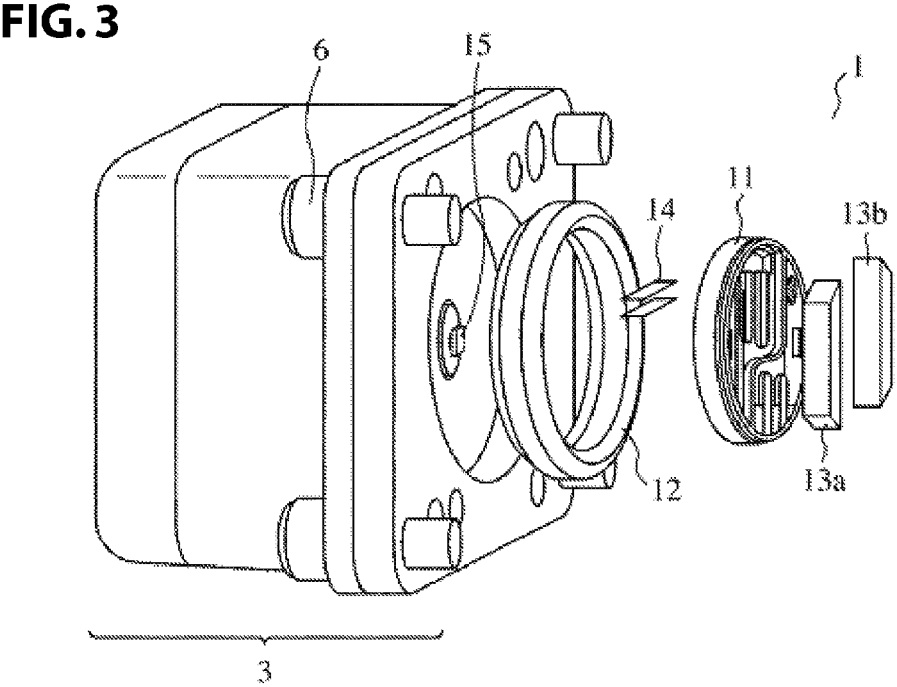
FIG. 3 is a perspective assembly diagram illustrating the fluid measuring portion in FIGS. 1A-C along with the peripheral structure.

FIG. 3 is a perspective view assembly diagram illustrating the fluid measuring portion in FIG. 1 and the peripheral structure. As illustrated in FIG. 3, a sensor 15 for detecting the fluid to be measured is provided on the surface of the body portion 2 side of the fluid measuring portion 3, where the fluid measuring portion of the sensor 15 faces the flow path that is formed on the fluid measuring portion 3 side of the branched flow path structuring portion 11. The detection signal of the sensor 15 is outputted to the fluid measuring portion 3 from a lead line (not shown), or the like.

The branched flow path structuring portion 11 has flow paths structured on both the body portion 2 side and the fluid measuring portion 3 side, where the fluid to be measured for which the flow branches from the main flow path 7 through the branch flow portion 9 flows into the flow path that is formed on the surface on the fluid measuring portion 3 side from the flow path that is formed on the surface on the body portion 2 side, and after the sensor 15 is exposed to the fluid to be measured, the fluid to be measured again returns to a flow path formed on the surface on the body portion 2 side, to flow out into the main flow path 7 through the branch flow portion 10. The branched flow path structuring portion 11 is a regulating member that reduces the flow speed of the fluid to be measured that is introduced from the body portion 2 side and also straightens any biased flow or turbulence in the fluid to be measured and directs the measurement flow to the sensor 15.

Additionally, this branched flow path structuring portion 11 also performs a function as a cover that covers the sensor 15 when the fluid measuring portion 6 is removed from the body portion 2, thus making it possible to prevent the sensor 15 from being exposed and from becoming damaged. Note that the branched flow path structuring portion 11 is, for example, attached using double-sided tape or an adhesive material, or the like, so as to not easily fall off from the attaching plate portion 3a. Doing so makes it possible to attach the branched flow path structuring portion 11 and the fluid measuring portion 3 to the body portion 2 detachably, without the branched flow path structuring portion 11 coming off of the fluid measuring portion 3 too easily.

Additionally, along with the filters 13a and 13b for particulate removal being attached detachably to the branched flow path structuring portion 11 on the body portion 2 side surface thereof, a metal mesh 14 may be provided on the fluid measuring portion 3 side surface, as illustrated in FIG. 3. The metal mesh 14 being disposed on the upstream side of the sensor 15 in the flow path that is formed on the surface of the branched flow path structuring portion 11 on the fluid measuring portion 3 side makes it possible to straighten any biased flow or turbulence in the fluid to be measured prior to being directed to the sensor 15. Furthermore, the metal mesh 14 is disposed with a plurality of layers within a given interval, but, in consideration of the flow speed of the fluid to be measured, and the like, the number of layers disposed, the sizes of the openings therein, and the spacing with which they are disposed may be adjusted as appropriate.

A case wherein the flow meter 1 as set forth in one embodiment is achieved through a flow meter that uses a thermal flow rate sensor will be described next. In this flow meter, the speed of flow of the fluid is detected using a thermal flow rate sensor, where this detected flow speed is multiplied by the cross-sectional area to calculate the flow rate of the fluid. A thermal flow rate sensor of a semiconductor diaphragm structure as disclosed in, for example, Japanese Patent 3096820 ("JP '820") may be used as the sensor 15.

Figure 4A:
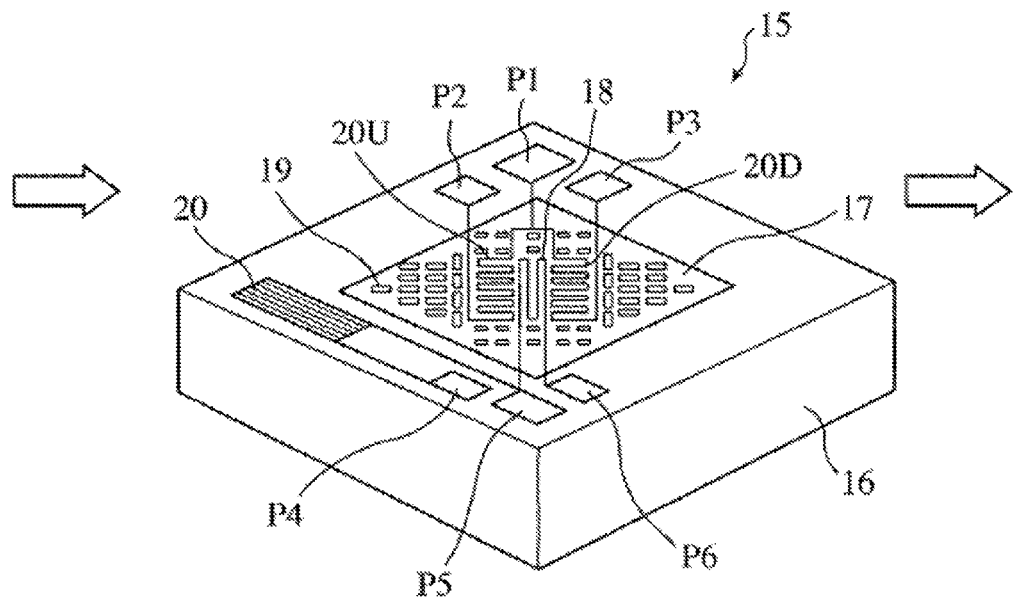
FIG. 4 is a diagram illustrating the structure of a sensor as set forth in one embodiment according to the present invention.
Figure 4B:
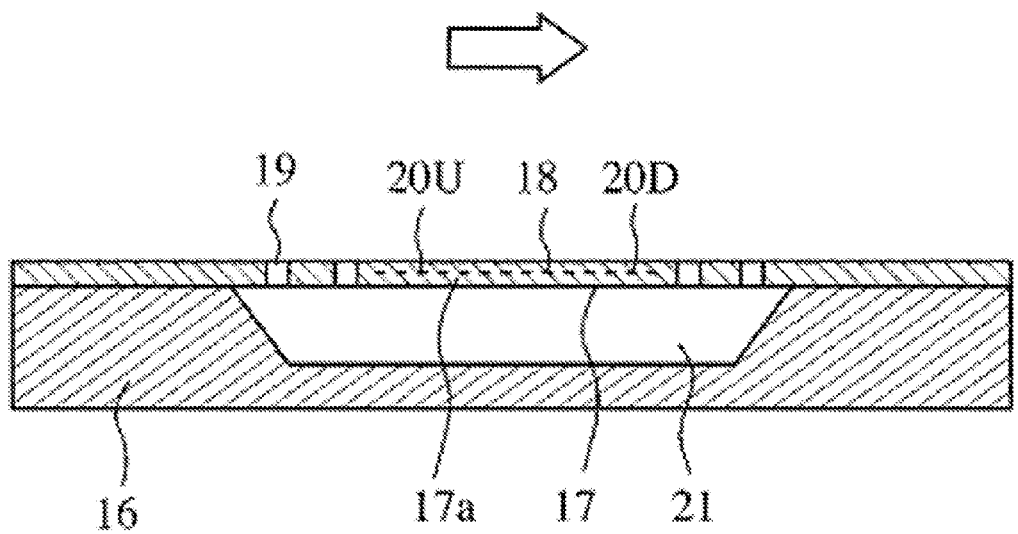

FIG. 4 is a diagram illustrating the structure of a sensor illustrating the sensor structure and the operating principle disclosed in JP '820. Note that FIG. 4 (a) shows a perspective view of the sensor, and FIG. 4 (b) is a cross-sectional diagram sectioned along the direction indicated by the arrows in FIG. 4 (a). The sensor 15 illustrated in FIG. 4 is provided with a platform 16 made from a base material such as a silicon chip that is 1.7 mm on a side with a thickness of 0.5 mm. An ambient temperature sensor 20 and electrode pads P1 through P6 are formed on the top surface peripheral edge portions of the platform 16. Moreover, a heater 18, an upstream-side temperature sensor 20 U, and a downstream-side temperature sensor 20 D are formed from thin films using a pattern of platinum, or the like, on a diaphragm portion 17 in the center of the platform 16, and are covered by an insulating layer 17a. Note that the resistance values in the platinum thin-film vary depending on the temperature, and thus the platinum thin-film functions as a temperature-measuring resistor.

The heater 18 is disposed in the center of the platform 16, the upstream-side temperature sensor 20 U is disposed on the upstream side of the heater 18 relative to the direction of flow of the fluid indicated by the arrow in FIG. 4 (a), and the downstream-side temperature sensor 20 is disposed on the downstream side, which is the opposite side. Additionally, a cavity 21 wherein a portion of the base material has been removed, as illustrated in FIG. 4 (b), is formed through a process such as anisotropic etching in the central portion of the platform 16. The fabrication, over the cavity 21, of the diaphragm portion 17 that is provided with a slit 19 that penetrates to the cavity 21 thermally isolates the heater 18, the upstream-side temperature sensor 20 U and the downstream-side temperature sensor 20 D from the platform 16.

The operating principle for the sensor 15 is that of generating a specific temperature distribution by heating the fluid to be measured through a heater 18 to a particular temperature, for example, several dozen degrees Celsius, higher than the fluid temperature measured by the ambient temperature sensor 20, and then measuring that temperature distribution using the upstream-side temperature sensor 20 U and the downstream-side temperature sensor 20 D, to measure the flow speed of the fluid to be measured.

For example, if the fluid to be measured is stationary, then the temperature distribution obtained from the upstream-side temperature sensor 20 U and the downstream-side temperature sensor 20 D would be symmetrical, but when a flow is produced in the fluid to be measured, then this symmetry is destroyed, and the temperature produced by the downstream-side temperature sensor 20 D would be higher than that of the upstream-side temperature sensor 20 U. It is possible to calculate the speed of flow, based on the physical properties of the fluid to be measured, such as the thermal conductivity, through detecting the temperature difference using a bridge circuit. Note that the thermal flow rate sensor described above is not only small in terms of size, but uses an extremely thin diaphragm structure that is thermally insulated, and thus has the benefits of highly sensitive temperature analysis, rapid responsiveness, and low power consumption. For example, it is possible to measure even an extremely low flow speed of about 1 cm/s in the fluid to be measured. Consequently, this thermal temperature sensor can be applied to a flow meter 1 wherein there is a low flow speed within the fluid measuring portion 3 through branching the flow of the fluid to be measured through an extremely small opening diameter narrow portion 9a in the branch flow portion 9.

Additionally, because there is left-right symmetry in the distribution of the upstream-side temperature sensor 20 U and the downstream-side temperature sensor 20 D with the heater 18 interposed therebetween, it is possible to measure not only a forward flow but a reverse flow as well. For example, even when the fluid to be measured flows in the reverse direction that is opposite of the direction of the arrow illustrated in FIG. 4 (a), the use of the sensor described above makes it possible to measure the fluid to be measured that is flowing in the reverse direction.

Figure 5A:
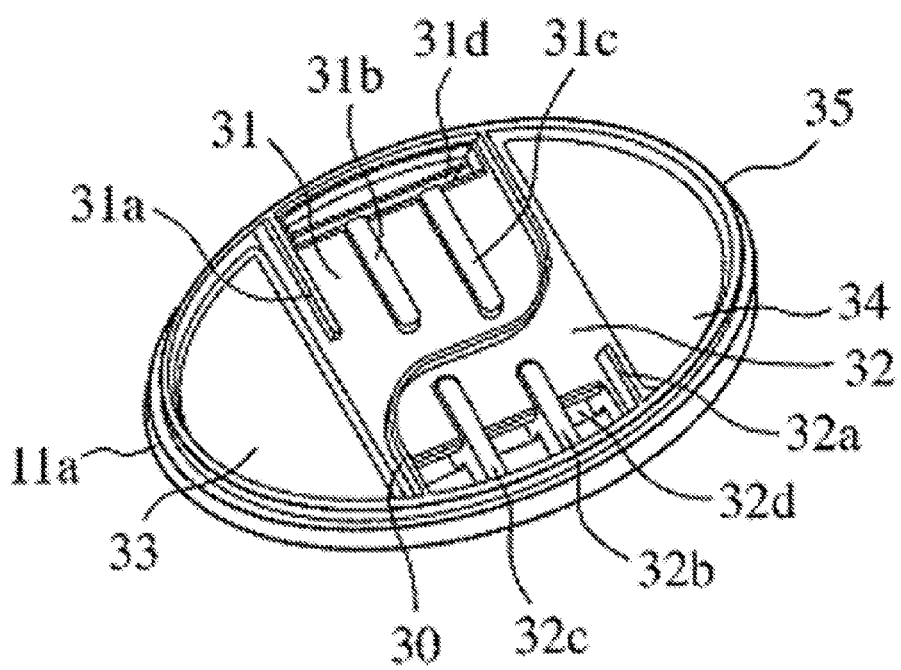
FIG. 5 is a perspective view showing the structure of the branched flow path structuring portion as set forth in one embodiment according to the present invention.
Figure 5B:
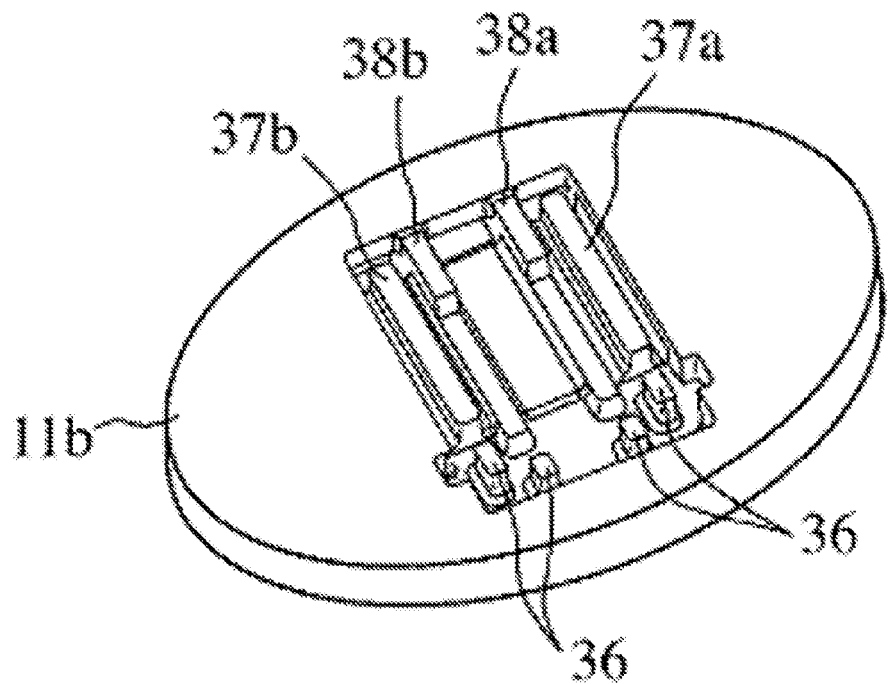
Figure 5C:
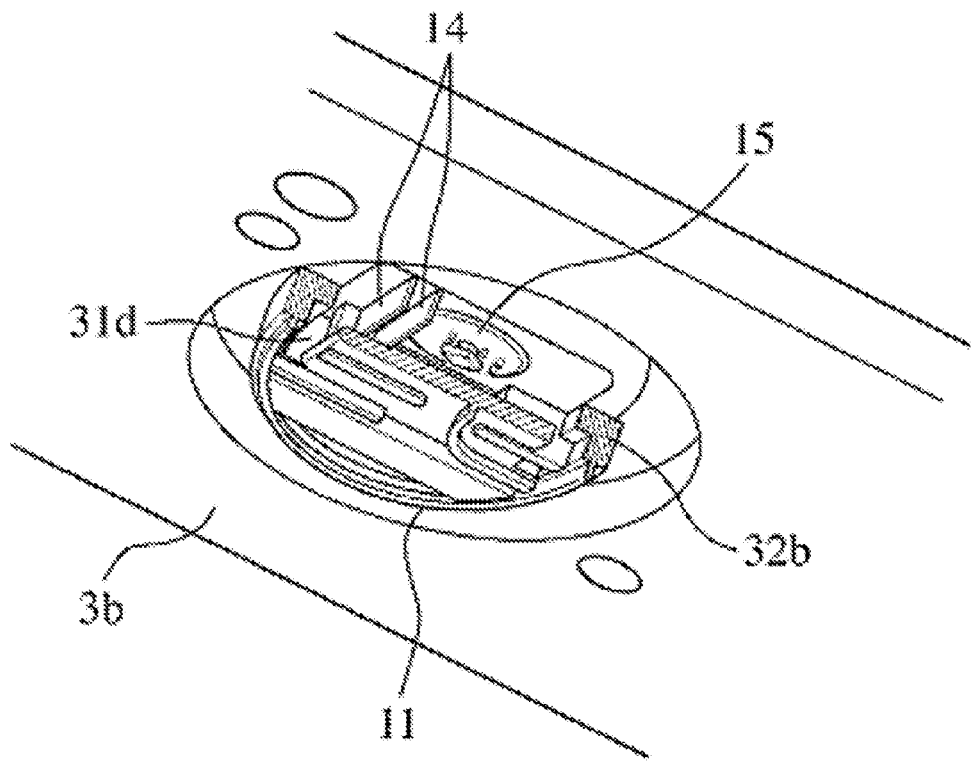

The details of the branched flow path structuring portion 11 will be described next. FIG. 5 is an oblique view illustrating the structure of the branched flow path structuring portion of the flow meter, where FIG. 5 (a) illustrates the structure of the body portion-side surface, FIG. 5 (b) illustrates the structure of the fluid measuring portion-side surface, and FIG. 5 (c) illustrates the structure when the branched flow path structuring portion is attached to the substrate. Note that the flow of the fluid to be measured from the branch flow portion 9 towards the branched flow path structuring portion 11 will be termed the "forward direction" below, and the flow of the fluid to be measured from the branch flow portion 10 towards the branched flow path structuring portion 11 will be termed the "reverse direction."

The branched flow path structuring portion 11 is made of a resin, or the like, which is processed through the use of a cookie cutter-type fabrication process, or a metal, or the like, which is processed through the use of removing fabrication process. The body portion-side surface (the first flow path and third flow path) 11a, illustrated in FIG. 5 (a) is provided with an essentially S-shaped partitioning wall (participating member) 30 in the center portion thereof, and is structured from an upstream-side flow path (first flow path) 31 and a downstream-side flow path (third flow path) 32, which are partitioned by the partitioning wall 30, and recessed portions (buffer portions) 33 and 34 for use as buffers for additional fluid flow. Additionally, an outer peripheral wall 35 is formed connecting to the partitioning wall 30 at the outer peripheral portion of the body portion-side surface 11a, so as to press against the body portion 2 when the fluid measuring portion 3 is attached to the body portion 2, so that the body portion-side surface 11a is sealed thereby, to prevent leakage of the fluid to be measured.

Additionally, in FIG. 5 (a) the structure is such that the surface area of the downstream-side flow path 32 is less than that of the upstream-side flow path 31. Here, when measuring the fluid to be measured in a reverse flow, the fluid to be measured that is introduced is guided to the sensor 15 after having been straightened in the downstream-side flow path 32, the fluid to be measured that is introduced into the downstream-side flow path 32 will be at a low rate when compared to measuring in the forward flow direction. Note that the structure may be one instead wherein the surface area of the upstream-side flow path 31 is equal to the surface area of the downstream-side flow path 32, and the surface areas of the upstream-side flow path 31 and the downstream-side flow path 32 may be varied as appropriate.

Three flow straightening pieces (flow straightening elements) 31a, 31b, and 31c, having different lengths, and a flow path reversing hole (a first connecting hole portion) 31d for guiding the fluid to be measured from the body portion-side surface 11a to the fluid measuring portion-side surface (the second flow path) 11b are formed in the upstream-side flow path 31. The flow straightening piece 31a is connected to the outer peripheral wall 35, and is structured so as to have a height that is greater than that of the flow straightening pieces 31b and 31c, in order to increase the buffering effect by the recessed portion 33 for buffering. Furthermore, in order to enable the connection of the fluid to be measured between the various straightening pieces 31a, 31b, and 31c, the lengths of the individual flow straightening pieces are such that 31a<31b<31c. Having the length of the straightening piece 31a be the shortest increases the width of the inlet of the flow path facing the flow path reversing hole 31d from the recessed portion 33 for the buffer, and enables an extremely uniform flow of the fluid to be measured in the three flow paths that are partitioned by the flow straightening pieces 31a, 31b, and 31c that are formed on the upstream-side flow path 31, making it possible to obtain the flow straightening effect.

Similarly, in the downstream-side flow path 32 as well, that are formed three flow straightening pieces (flow straightening elements) 32a, 32b, and 32c, having different lengths, and a flow path reversing hole (a second connecting hole portion) 32d, for guiding the fluid to be measured from the fluid measuring portion-side surface 11b to the body portion-side surface 11a. The flow straightening piece 32a is provided connected to the outer peripheral wall 35, and is structured so that the height of the piece is higher than that of the flow straightening pieces 32b and 32c, in order to increase the buffering effect through having a recessed portion 34 for a buffer. Additionally, the lengths of the individual flow straightening pieces are such that 32a<32b<32c, so that the fluid to be measured can be connected between the individual flow straightening pieces 32a, 32b, and 32c. By having the length of the flow straightening piece 32a be the shortest, the inlet of the flow path facing the flow path reversing hole 32d from the recessed portion 34 for the buffer will be wide, making it possible for the fluid to be measured to flow with extreme uniformity in each of the three flow paths that are partitioned by the flow straightening pieces 32a, 32b, and 32c that are formed in the downstream-side flow path 32.

While, when it comes to the flow path reversing holes 31d and 32d, not partitioning by the individual flow straightening pieces would be able to increase the flow straightening effects on the fluid to be measured, flow straightening pieces 32b and 32c may be formed so as to span the flow path reversing hole 32d in the downstream-side flow path 32, which has little impact on the flow rate measurement of the fluid to be measured in the forward direction, as illustrated in FIG. 5 (a), to petition the flow path reversing hole 32d into three parts.

The fluid to be measured that flows into the recessed portion 33 for the buffer, from the branch flow portions 9 and 10, is held for a time in the recessed portions 33 and 34 for buffering (that is, it is buffered). Doing so causes the flow speed of the fluid to be measured to decrease, thus increasing the amount of dust that can be captured by the filters 13a and 13b. And other words, the flow speed of the fluid to be measured being reduced by the recessed portions 33 and 34 for buffering increases the particulate preventing effect of the filters 13a and 13b relative to the case wherein the flow speed of the fluid to be measured is maintained.

The structure of the fluid measuring portion-side surface 11b will be described next using FIG. 5 (b). Flow path reversing holes 31d and 32d, illustrated in FIG. 5 (a), are formed on both ends of the fluid measuring portion-side surface 11b. Additionally, four metal mesh retaining pieces 36 for retaining a metal mesh 14, two wall portions (vector aligning members) 37a and 37b, and two sill pieces (vector aligning members) 38a and 38b are provided in the center portion. Note that in this embodiment, the measurement range of the fluid measurement in the forward flow direction is broader than the measurement range of the fluid measurement in the reverse flow direction, and thus a structure is illustrated wherein the metal mesh 14 is provided in order to obtain a greater flow straightening effect.

The metal mesh 14 is inserted between the four metal mesh retaining pieces 36 and the end portions of the sill pieces 38a and 38b on the flow path reversing hole 31d side, to dispose, at equal intervals, a plurality of metal meshes 14 on the upstream side of the sensor 15, as illustrated in FIG. 5 (c). The wall portions 37a and 37b and the sill pieces 38a and 38b are adjusted to cause the flow speed vectors within the fluid to be measured that flows into the sensor 15 part to be uniform, and to produce a flow straightening effect. Sill pieces 38a and 38b are formed so as to span the flow path reversing hole 32d.

Note that in the case wherein a flow meter is structured based on the content disclosed in Japanese Unexamined Patent Application Publication 2007-121036, the distance between the sensor 15 in the flow meter and the fluid measuring portion-side surface 11b that faces the sensor 15 is about 1 mm. Narrowing the flow path width wherein the fluid to be measured flows is able to produce a greater flow straightening effect, thus enabling measurement of the fluid to be done with higher accuracy.

Figure 6A:
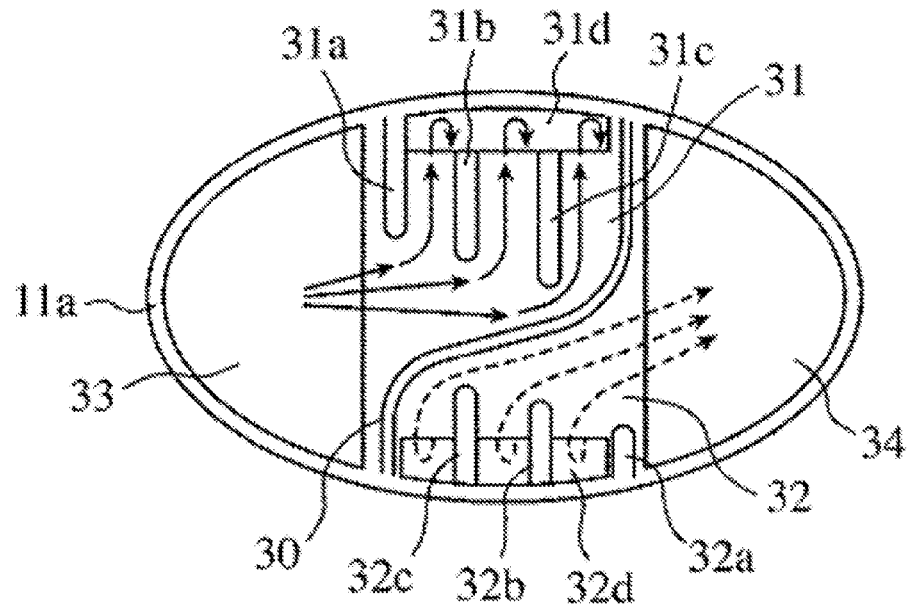
FIG. 6 is a diagram illustrating the flow of the fluid to be measured in the branched flow path structuring portion as set forth in one embodiment according to the present invention.
Figure 6B:
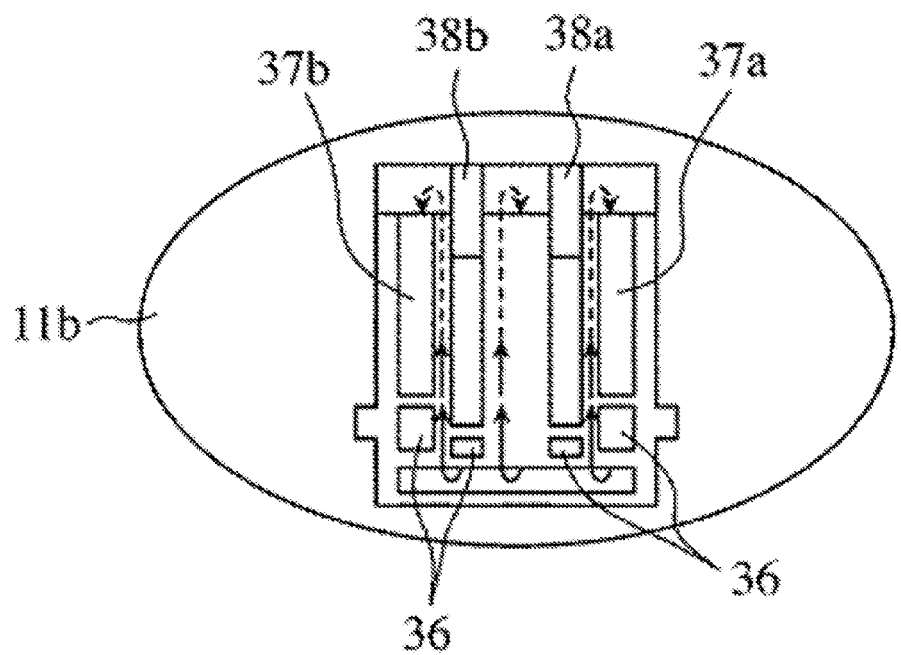

FIG. 6 is a diagram illustrating the forward-direction flow of the fluid to be measured in the flow meter as set forth in the one embodiment. FIG. 6 (a) illustrates the flow of the fluid to be measured on the body portion-side surface, and FIG. 6 (b) illustrates the flow of the fluid to be measured on the fluid measuring portion-side surface. In FIG. 6 the solid arrows indicate the flow of the fluid to be measured prior to the flow rate measurement, and the dotted arrows indicate the flow of the fluid to be measured after the flow rate measurement.

The fluid to be measured that is introduced into the recessed portion 33 for buffering from the branch flow portion 9, indicated by the solid arrows in FIG. 6 (a), is introduced into the upstream-side flow path 31, widening at a constant angle. Here the speed of the fluid to be measured is suppressed and the fluid to be measured widens at a constant angle because the gap between the partitioning wall 30 and the flow straightening piece 31a is structured so as to be wide. The fluid to be measured that is introduced into the upstream-side flow path 31 has the direction of flow thereof changed by the partitioned wall 30, so the flow speed vectors thereof change gradually, along with the flow being straightened, as the fluid to be measured passes between the individual flow straightening pieces 31a, 31b, and 31c. Following this, the direction of flow changes in the flow path reversing hole 31d, and the fluid to be measured is introduced to the fluid measuring portion-side surface 11b.

The fluid to be measured that has been introduced into the fluid measuring portion-side surface 11b, as illustrated by the solid arrows in FIG. 6 (b), first experiences flow straightening by the metal mesh 14, after which the surface area of the inflow is determined by the wall portions 37a and 37b, the flow speed vectors of the fluid to be measured that is exposed to the sensor 15 part are made uniform by the sill pieces 38a and 38b, and the flow speed is detected by the sensor 15. The flow speed vectors of the fluid to be measured that flows into the sensor 15 change to a direction that is essentially perpendicular to the flow speed vectors of the fluid to be measured that flows in the main flow path 7.

Thereafter, the direction of flow of the fluid to be measured is changed again by the flow path reversing hole 32d, and the fluid to be measured is introduced into the downstream-side flow path 32. The fluid to be measured that is introduced into the downstream-side flow path 32, as illustrated by the dotted arrows in FIG. 6 (a), passes between the individual flow straightening pieces 32a, 32b, and 32c in order to undergo flow straightening, and passes through the recessed portion 34 for buffering and the filter 13b, to join the airflow in the main flow path 7 from the branch flow portion 10.

Figure 7A:
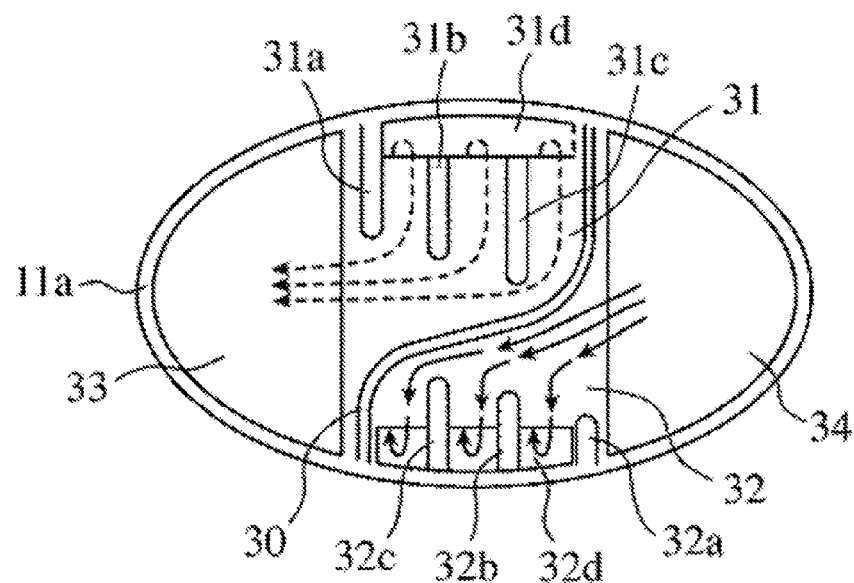
FIG. 7 is a diagram illustrating the flow of the fluid to be measured in the branched flow path structuring portion as set forth in one embodiment according to the present invention.
Figure 7B:
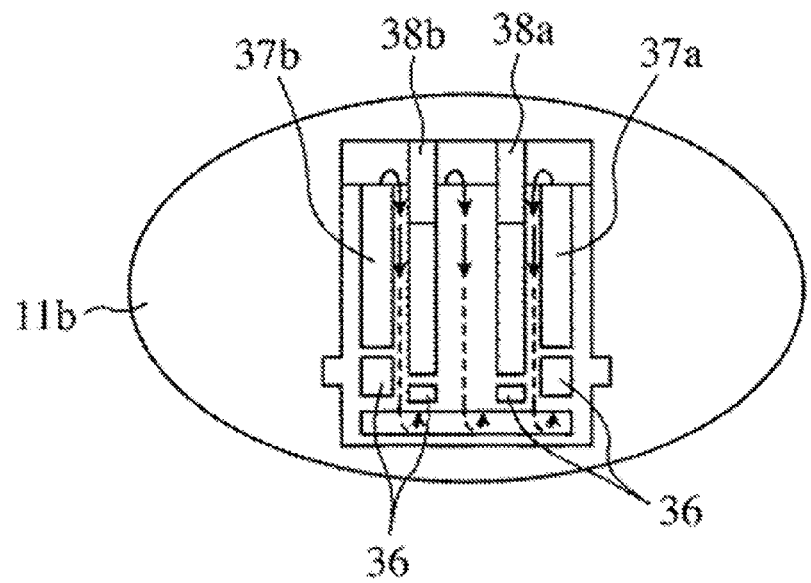
Figure 8:
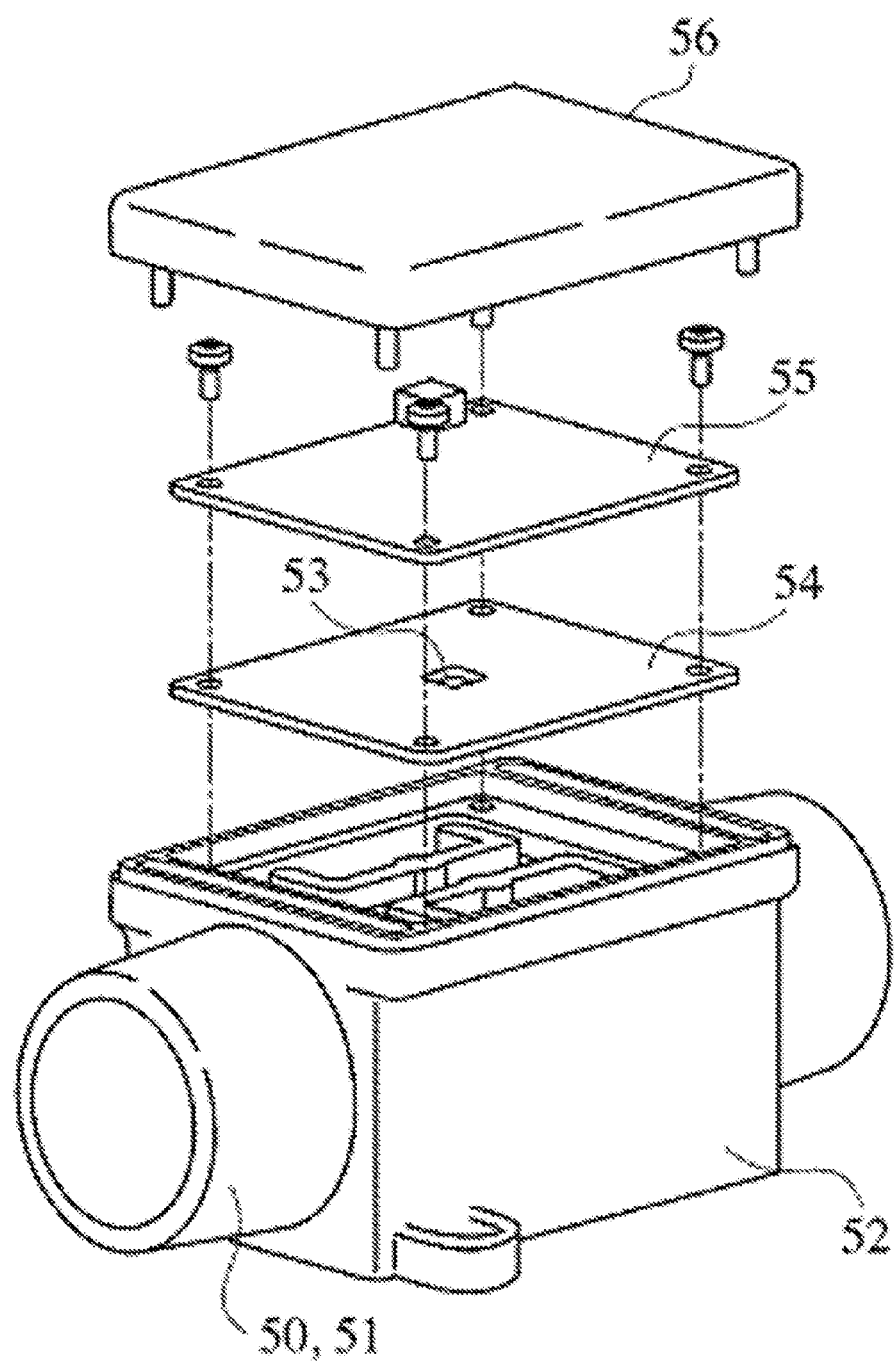
FIG. 8 is a perspective assembly diagram of a conventional flow meter.
Figure 9:
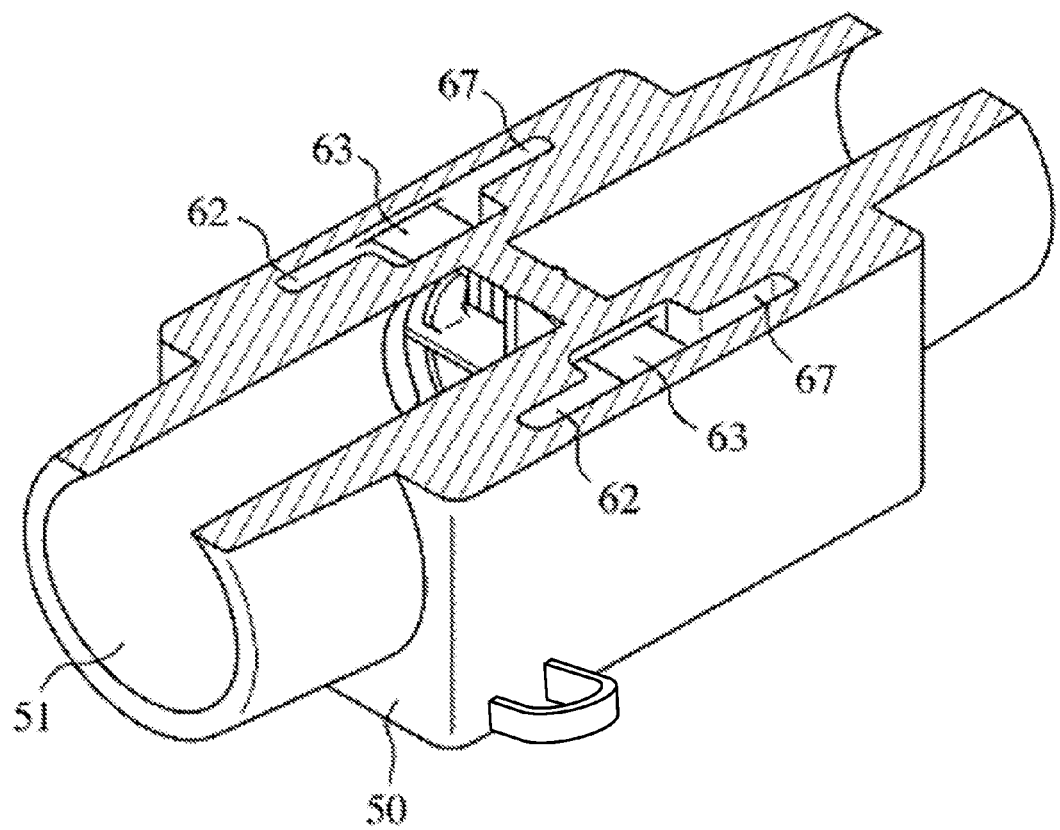
FIG. 9 is a partial cross-sectional diagram of a conventional flow meter.
Figure 10:
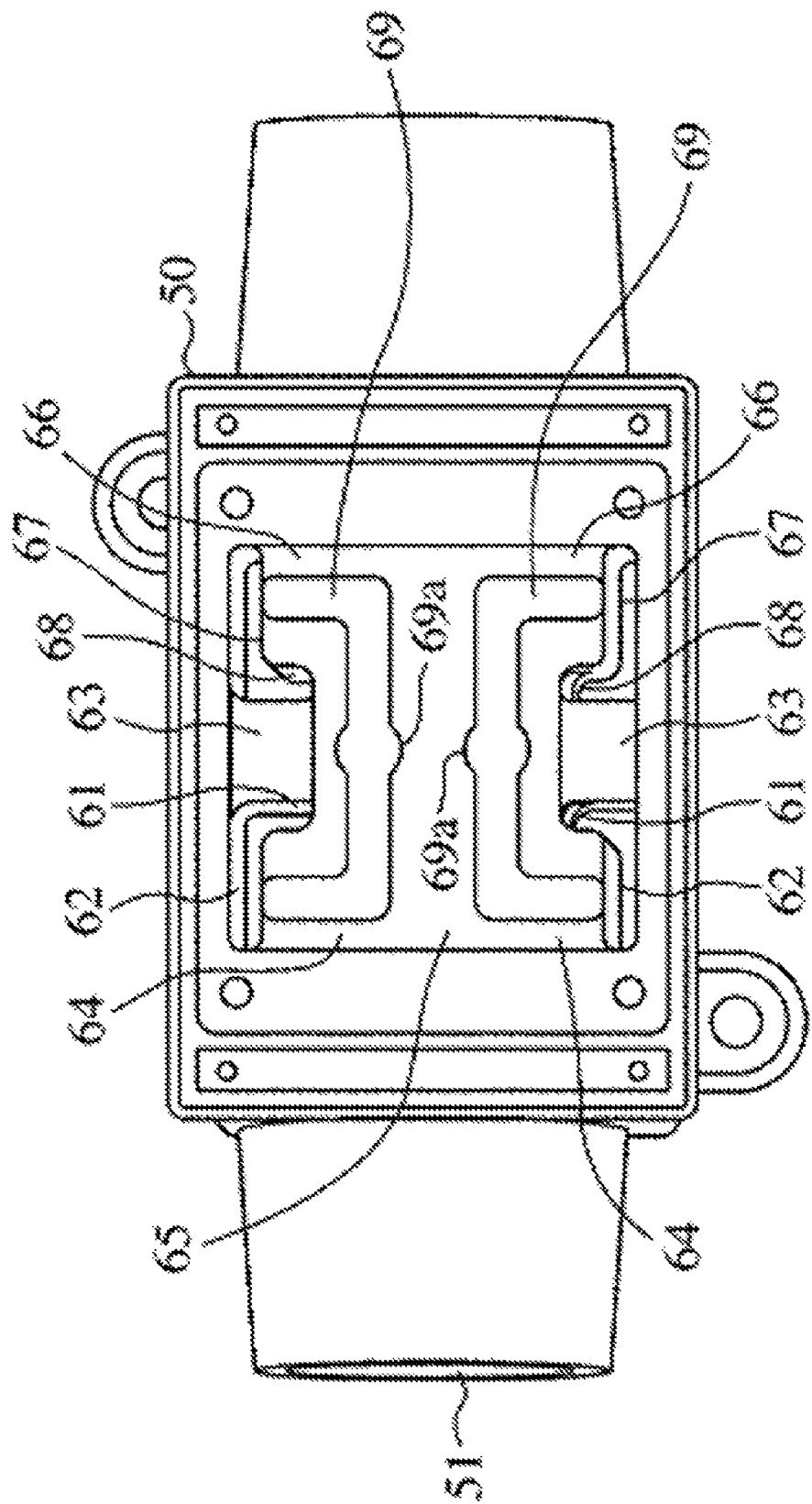
FIG. 10 is a partial cross-sectional diagram of a conventional flow meter.

The operation of the flow meter for measuring the flow rate of the fluid to be measured in the reverse direction will be explained next. FIG. 7 is a diagram illustrating the reverse-direction of flow of the fluid to be measured in the flow meter as set forth in one embodiment.

FIG. 7 (a) illustrates the flow of the fluid to be measured on the body portion-side surface, and FIG. 7 (b) is a diagram illustrating the flow of the fluid to be measured on the fluid measuring portion-side surface. In FIG. 7, the solid arrows indicate the flow of the fluid to be measured prior to the flow rate measurement and the dotted arrows indicate the flow of the fluid to be measured after the flow rate measurement.

The fluid to be measured that is introduced into the recessed portion 34 for buffering from the branch flow portion 10, indicated by the solid arrows in FIG. 7 (a), is introduced into the downstream-side flow path 32, widening at a constant angle. Here the speed of the fluid to be measured is suppressed and the fluid to be measured widens at a constant angle because the gap between the partitioning wall 30 and the flow straightening piece 32a is structured so as to be wide. The fluid to be measured that is introduced into the downstream-side flow path 32 has the direction of flow thereof changed by the partitioned wall 30, so the flow speed vectors thereof change gradually, along with the flow being straightened, as the fluid to be measured passes between the individual flow straightening pieces 32a, 32b, and 32c. Following this, the direction of flow changes in the flow path reversing hole 32d, and the fluid to be measured is introduced to the fluid measuring portion-side surface 11b.

In the fluid to be measured that has been introduced into the fluid measuring portion-side surface 11b, as illustrated by the solid arrows in FIG. 7 (b), the flow speed vectors of the fluid to be measured that is exposed to the sensor 15 part are made uniform by the wall portions 37a and 37 and the sill pieces 38a and 38b, and the flow speed is detected by the sensor 15. The flow speed vectors of the fluid to be measured that flows into the sensor 15 change to a direction that is essentially perpendicular to the flow speed vectors of the fluid to be measured that flows in the main flow path 7.

Thereafter, after flow straightening by the metal mesh 14, the direction of flow of the fluid to be measured is changed again by the flow path reversing hole 31d, and the fluid to be measured is introduced into the upstream-side flow path 31. The fluid to be measured that is introduced into the upstream-side flow path 31, as illustrated by the dotted arrows in FIG. 7 (a), passes between the individual flow straightening pieces 31a, 31b, and 31c in order to undergo flow straightening, and passes through the recessed portion 33 for buffering and the filter 13a, to join the airflow in the main flow path 7 from the branch flow portion 9.

As described above, in some embodiments, a body portion 2, having a main flow path 7 wherein flows a fluid to be measured, a branch flow portion 9 for branching of the flow of the fluid to be measured from the main flow path 7, a branch flow portion 10 for causing the fluid to be measured for which the flow has been branched by the branch flow portion 9 to flow into the main the flow path 7, and an orifice 8 that is provided in the main flow path 7 between the branch flow portions 9 and 10 in order to narrow the flow of the fluid to be measured; a branched flow path structuring portion 11 for carrying the fluid to be measured, connected to the branch flow portions 9 and 10; and a fluid measuring portion 3, having a sensor 15 that is disposed facing the flow path that is provided in the branched flow path structuring portion 11, for measuring the fluid to be measured based on the detection result of the fluid to be measured that is introduced from the branch flow portions 9 and 10, detected by the sensor 15, are provided, and the branched flow path structuring portion 11 and the fluid measuring portion 3 are attached detachable to the body portion 2, where, because the flow of the fluid to be measured is narrowed, even if there is a small leak of the fluid to be measured temporarily from the pipe, it is still possible to remove the fluid measuring portion 3 from the body portion 2 without stopping the flow of the fluid to be measured within the pipe. This makes it possible to perform easily maintenance and investigations when there are problems, without stopping the flow of the fluid to be measured within the pipe, eliminating the need for cutoff valves, and the like, for shutting off the fluid to be measured from the pipe, thus making it possible to achieve a reduction in size, using a simple structure.

Additionally, in some embodiments, the structure is such that a branched flow path structuring portion 11 is provided at a position that covers the sensor 15 and the fluid to be measured that has been introduced from the body portion side is reversed and provided to the sensor 15, and the branched flow path structuring portion 11 and the fluid measuring portion 3 are attached detachably to the body portion 2, but because the structure is such that the branched flow path structuring portion 11 does not come off of the fluid measuring portion 3 too easily, the branched flow path structuring portion 11 functions as a cover for the sensor 15 when the fluid measuring portion 3 is removed from the body portion 2, making it possible to prevent the sensor 15 from being exposed and damaged or destroyed.

In some embodiments, the structure is such that a plurality of flow straightening pieces are provided on the body portion-side surface 11a of the branched flow path structuring portion 11 so that the flow of the fluid to be measured is straightened by the individual flow straightening pieces after the flow speed of the fluid to be measured that has been introduced from the branch flow portion 9 of the body portion 2 has been reduced, making it possible to perform a stabilized flow rate measurement on the fluid to be measured. Additionally, because the lengths of the flow straightening pieces are formed so as to be shorter the closer to the recessed portions 33 and 34 for buffering, the inlet to the flow path facing the first flow straightening portion or the second flow straightening portion of the recessed portion for buffering widens at, making it possible to cause the fluid to be measured in each of the flow paths, which are partitioned by the plurality of flow straightening pieces, to be extremely uniform, enabling a flow straightening effect.

In some embodiments, the structure is such that the flow path is reversed through the provision of the flow path reversing holes 31d and 32d in the branched flow path structuring portion 11, not only making it possible to secure a flow path that performs adequate flow straightening on the fluid to be measured, but also making it possible to reduce the size of the flow rate measuring portion In some embodiments, the structure is such that a body portion-side surface 11a, a fluid measuring portion-side surface 11b, and a flow path reversing holes 31d and 32d are provided in the branched flow path structuring portion 11 to reverse the flow path of the fluid to be measured, and such that the flow of the fluid to be measured is straightened by the straightening piece after the flow speed of the fluid to be measured has been reduced by the recessed portions 33 and 34 for buffering, thus making it possible to perform flow straightening after securing an adequate flow path length through which the fluid to be measured flows, thereby enabling accurate fluid measurements. This also enables the size of the flow meter to be reduced.

When the body portion 2 is disposed so that the flow of the fluid to be measured that flows through the main flow path 7 is in the direction of gravity, such as when the flow meter is attached to a vertical pipe, it is known that there will be a bias towards the direction of the resistor on the vertically higher side in the distribution of temperature of the fluid to be measured around the upstream and downstream resistors provided in the sensor, so as to be parallel with the flow speed vector of the fluid to be measured that is exposed to the sensor 15 when the flow speed vector of the fluid to be measured that flows in the main flow path 7 is identical to the flow speed vector of the fluid to be measured that is exposed to the sensor 15. In this case, when there is a low flow rate or a zero flow rate, then there will be noticeable measurement error and a noticeable drift in the zero point; however, in some embodiments it is possible to form a structure wherein the flow speed vector of the fluid to be measured that flows in the main flow path 7 and the flow speed vector of the fluid to be measured that is introduced to the sensor 15 on the fluid measuring portion-side surface 11b are essentially perpendicular, thus making it possible to get by without a bias towards either resistor in the temperature distribution of the fluid to be measured around the upstream and downstream resistors provided in the sensor 15 through having the flow speed vectors in the fluid to be measured that is exposed to the sensor 15 be parallel. This is able to suppress the measurement error at low flow rates and suppress the zero-point drift when the flow rate is zero. Moreover, this is able to ensure adequately long flow paths through which the fluid to be measured flows. Additionally, in some embodiments, the structure is such that a plurality of flow straightening pieces and flow path reversing holes 32d are provided in the downstream-side flow path 32 on the body portion-side surface 11 of the branched flow path structuring portion 11, and structured so as to provide a sensor 15 that has a left/right linearly symmetrical structure, thus making it possible to measure accurately also the flow rate of a reverse flow that is a flow of the fluid to be measured towards the sensor 15 from the downstream-side flow path 32.

Note that while an example was illustrated wherein the branched flow path structuring portion 11, the rubber packing 12, and the hole portion of the substrate 3b were formed in an elliptical shape, there is no limitation to the elliptical state, but rather the structure may be a shape matching the shape of the branch flow portions 9 and 10 of the body portion 2 into which the fluid to be measured is introduced.

Note that while in some embodiments a structure was illustrated wherein a metal mesh 14 was provided in the vicinity of the flow path reversing hole 31d, a metal mesh 14 may also be provided directly after the flow path reversing hole 32d in a structure wherein a reverse-flow fluid to be measured that is introduced from the downstream-side flow path 32 is straightened by the metal mesh 14 and then provided to the sensor 15.

The invention claimed is:

1. A flow meter comprising:
   a body portion containing a main flow path wherein a fluid to be measured flows;
   a first branch flow path branching the flow of the fluid to be measured from the main flow path;
   a second branch flow path causing the fluid to be measured, for which the flow has been branched, to flow back into the main flow path from the first branch flow path;
   a narrow portion for narrowing the flow of the fluid to be measured, provided between the first and second branch flow paths; and
   a fluid measuring portion having:
   a branched flow path structuring portion that is provided with a flow path for carrying the fluid to be measured, connected to the first and second branch flow paths; and
   a sensor disposed facing the flow path provided in the branched flow path structuring portion, measuring the fluid to be measured based on a detection result for the fluid to be measured that has been introduced from the branch flow path, detected by the sensor;
   wherein the fluid measuring portion is detachably attached to the body portion.

2. A flow meter as set forth in claim 1, wherein the first and second branch flow paths comprise a first and a second narrow portion, respectively, located in the first and second branch flow paths closest to the main flow path.

3. A flow meter as set forth in claim 2, wherein the first and the second narrow portions have a first end and a second end, the first ends are in fluid communication with the main flow path and the first and the second narrow portions have a first diameter;
   wherein the first and second branch flow paths further comprise a first and a second hole portion, respectively, the hole portions are disposed in fluid communication with the respective second ends of the first and second branch flow paths, and on an opposite end, with the branched flow path structuring portion, the hole portions having a second diameter,
   wherein the first diameter is less than the second diameter.

4. A flow meter comprising:
a sensor detecting a fluid to be measured, for measuring the flow rate of the fluid to be measured based on a detection result of the sensor;
a body portion that structures a main flow path wherein the fluid to be measured flows and that is provided with a first branch flow path and a second branch flow path for branching the flow of the fluid to be measured; and
a plate-shaped branched flow path structuring portion, provided between the body portion and the sensor, covering the sensor and connected to the first branch flow path and to the second branch flow path;
wherein the branched flow path structuring portion and the sensor are attached detachably to the body portion.

5. A flow meter comprising:
a sensor detecting a fluid to be measured, for measuring the flow rate of the fluid to be measured based on a detection result of the sensor;
a body portion that structures a main flow path wherein the fluid to be measured flows and that is provided with a first branch flow path and a second branch flow path for branching the flow of the fluid to be measured; and
a branched flow path structuring portion made from a flat member that is disposed between the body portion and the sensor, having:
  a first flow path formed on the body portion-side surface wherein the fluid to be measured for which the flow has been branched through the first branch flow path is introduced;
  a second flow path that is formed on the sensor-side surface;
  a first connecting hole portion for connecting the first flow path and the second flow path;
  a third flow path that is formed on the body portion-side surface for expelling the fluid to be measured through the second branch flow path into the main flow path; and
  a second connecting hole portion for connecting the second flow path and the third flow path;
  wherein the sensor is disposed facing the second flow path; and
  wherein the branched flow path structuring portion and the sensor are detachably attached to the body portion.

6. A flow meter as set forth in claim 5, comprising:
a partitioning member partitioning the body portion-side surface into the first flow path and the third flow path,
wherein the first flow path and the third flow path comprise a first and a third straightening element, respectively, straightening the flow of the fluid to be measured; and
wherein the second flow path comprises a vector adjusting member causing the speed vectors of the fluid to be measured to be uniform.

7. A flow meter comprising:
a fluid measuring portion for measuring a flow rate of a fluid to be measured based on a detection result of the sensor, having:
  a sensor detecting a fluid to be measured and
  a branched flow path structuring portion made from a plate-shaped member that is disposed between a body portion wherein the fluid to be measured flows and the sensor, wherein the branched flow path structuring portion further having:
    first and third flow paths formed on a body portion-side surface wherein the fluid to be measured, for which the flow has been branched from the body portion, flows in and out;
    first and second connecting hole portions connecting the body portion side and a sensor side;
    a second flow path, formed on the sensor-side surface, exposing, to the sensor, the fluid to be measured that flows in and out through the first and third flow paths and the first and second connecting hole portions;
    a partitioning member partitioning the first flow path on the upstream side of the flow of the fluid to be measured from the third flow path on the downstream side of the flow of the fluid to be measured;
    a buffer portion comprising a recessed portion wherein the fluid to be measured that flows in from the body portion is resident; and
    straightening elements, provided in the first and third flow paths, straightening the flow of the fluid to be measured that flows from the buffer portion towards the first and second connecting hole portions.

8. A flow meter as set forth in claim 7, wherein a flow speed vector of the fluid to be measured flowing through the main flow path of the body portion and a flow speed vector of the fluid to be measured that is exposed to the sensor in the second flow path are essentially perpendicular.

9. A flow meter as set forth in claim 7, wherein the flow straightening element comprises a plurality of raised locations extending from an opening portion of the first and second connecting hole portions;
wherein a length of the plurality of raised locations, from the first and second connecting hole portions, are shorter nearer the buffer portion, to guide the flow of the fluid to be measured from the buffer portion between the raised locations to the first and second connecting hole portions.

10. A flow meter as set forth in claim 7, wherein the branched flow path structuring portion further comprises a metal mesh retaining piece retaining a metal mesh;
wherein the metal mesh straightens the flow of the fluid to be measured that flows through the second flow path on the sensor side.

* * * * *